E. B. ARNOLD.
CORN HARVESTER ATTACHMENT.
APPLICATION FILED FEB. 25, 1911.
1,000,976.
Patented Aug. 22, 1911.
2 SHEETS—SHEET 2.
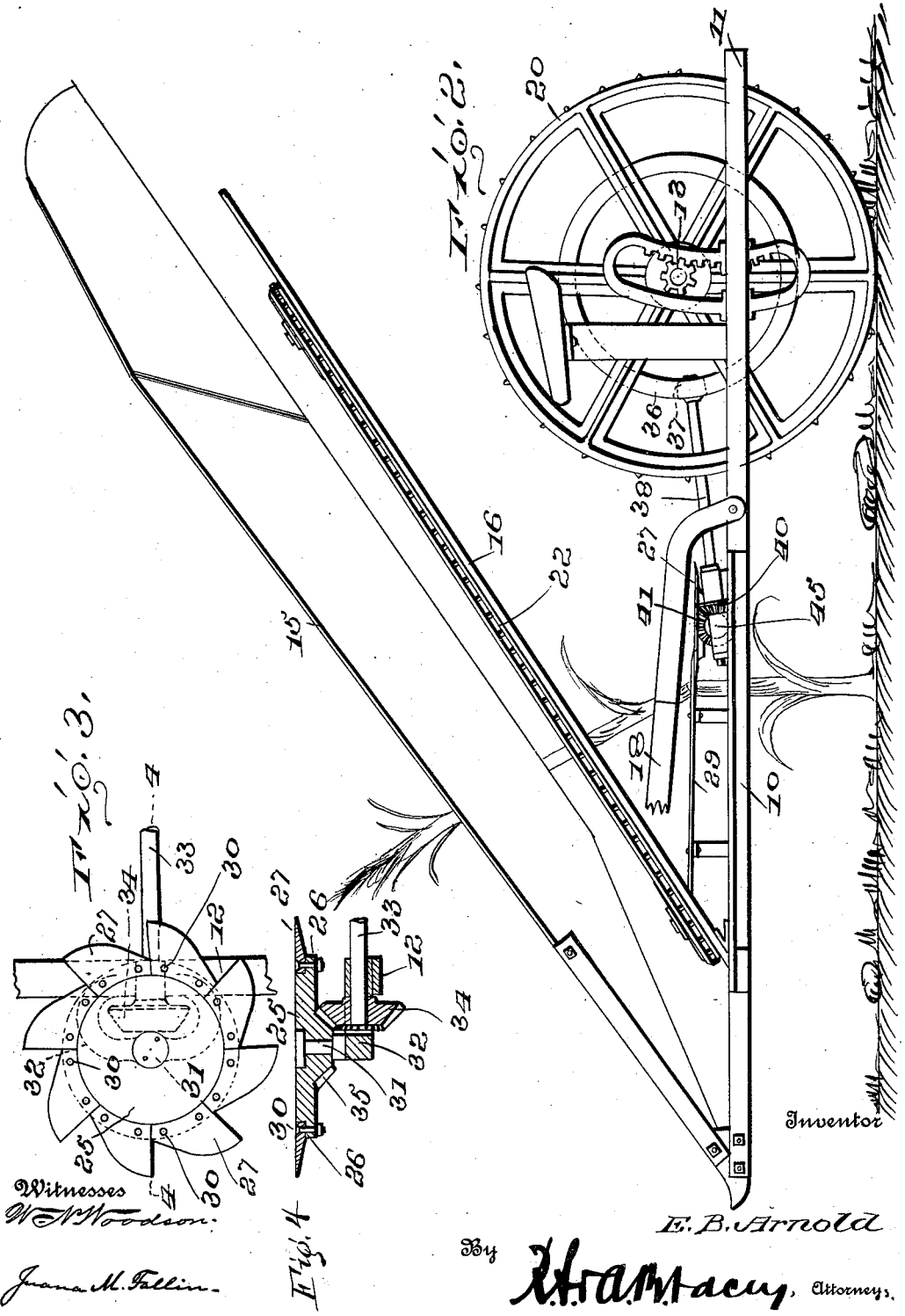

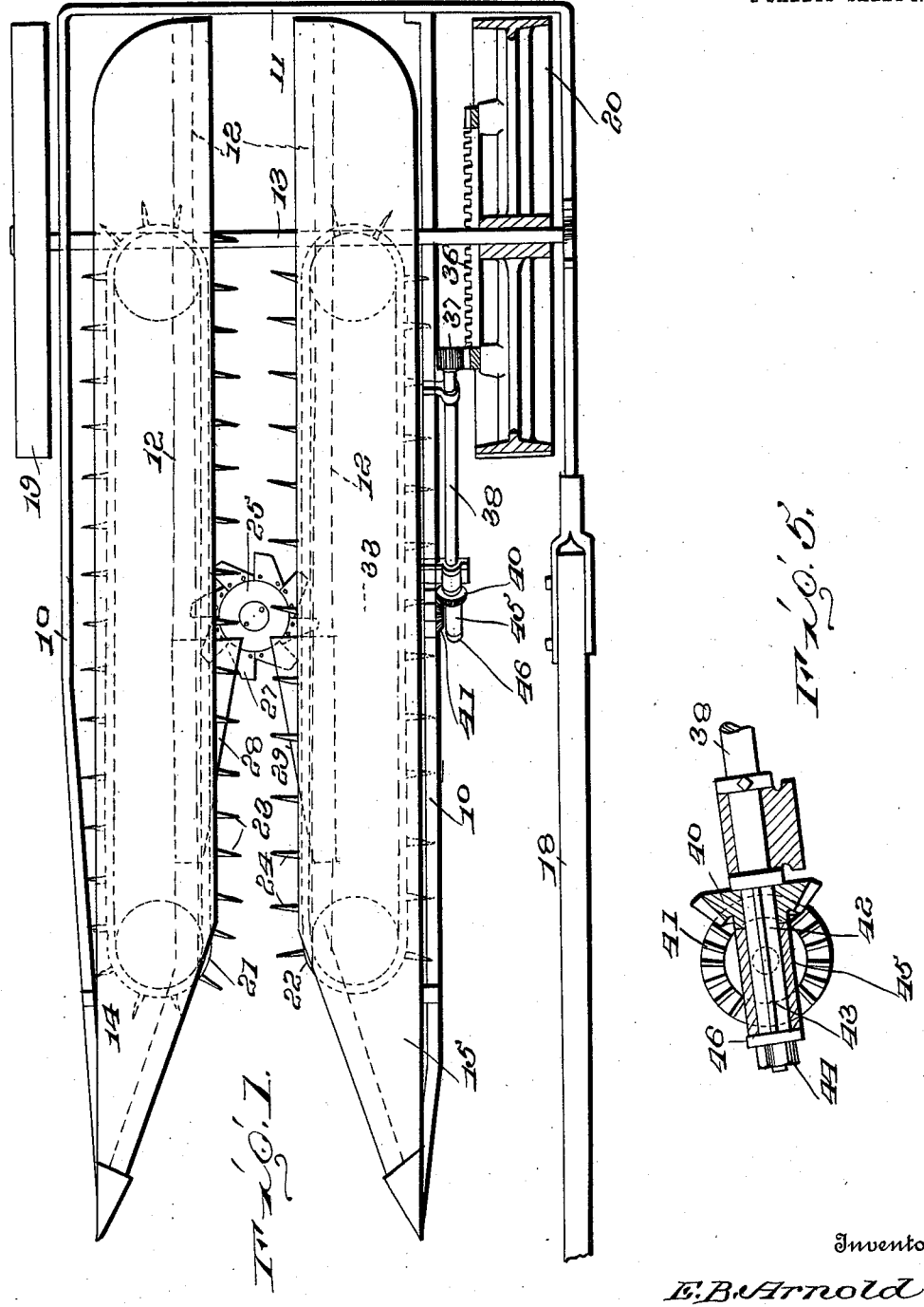

UNITED STATES PATENT OFFICE.

ELIJAH B. ARNOLD, OF GENOA, ILLINOIS.

CORN-HARVESTER ATTACHMENT.

1,000,976. Specification of Letters Patent. Patented Aug. 22, 1911.

Application filed February 25, 1911. Serial No. 610,879.

*To all whom it may concern:*

Be it known that I, ELIJAH B. ARNOLD, citizen of the United States, residing at Genoa, in the county of Dekalb and State of Illinois, have invented certain new and useful Improvements in Corn-Harvester Attachments, of which the following is a specification.

This invention relates to improvements in corn harvesters and similar machines, and has for its object to provide a simply constructed device which may be applied without material structural change to nearly all of the various makes of corn harvesters, and which operates to sever the stalks just previous to their passage to the binding mechanism, or to the receptacles or shockers.

With this and other objects in view the invention consists in certain novel features of construction as hereinafter shown and described and then specifically pointed out in the claims, and in the drawings illustrative of the preferred embodiment of the invention, Figure 1 is a plan view of a conventional corn harvester with the improvement applied; Fig. 2 is a side elevation of the same; Fig. 3 is a plan view, enlarged, of the cutting member; Fig. 4 is a section on the line 4—4 of Fig. 3; Fig. 5 is an enlarged sectional detail of the reversible gear.

Corresponding and like parts are referred to in the following description and indicated in all the views of the accompanying drawings by the same reference characters.

The improved device, as before stated, may be applied without material structural changes to nearly all of the ordinary makes of corn harvesters, and for the purpose of illustration is shown applied to a conventional machine of this character, and the machine thus employed for illustration comprises a base frame including outer members 10 which usually diverge rearwardly and are united to the main transverse portion 11. The base frame also generally includes inner members 12 which extend in parallel relations, the base frame being connected adjustably to the axle 13.

Rising from the forwardly converging frame members 10—12 are inclined gather boards 14—15 and the chain supporting plates 16, the latter being inclined at a lower angle than the gather boards. The members 14—15 and 16 are suitably supported by braces from the lower frame 10—11 in the usual manner. A draft tongue, represented at 18, is connected to one of the frame members 10, while the ground wheels 19—20 are carried by the axle, the ground wheel 20 being provided with the usual ground engaging ribs, as this wheel is utilized as a means for transmitting the requisite motion to the parts.

The plates 16 support the usual carrier chains 21—22 which are provided with the gather fingers 23—24 respectively.

The parts above described are of the usual construction and common to many forms of corn harvesters.

The improved attachment comprises a circular body 25 having an annular flange 26 to receive a plurality of encircling cutter blades 27, each blade having a curved cutting edge extending tangentially of the body. Connected to the inner frame members 12 are stationary blades 28—29 under which the cutting blades operate in close proximity, the stationary blades and the rotating blades thus co-acting to produce a shear like action when operated, as will be obvious. The blades 27 are detachably coupled to the flange 26 by bolts or other fastening devices 30 so that the blades can be removed for sharpening or for replacing an impaired blade, and are likewise reversible in position so that they can be mounted upon the body 25 to operate when the latter is rotated in either direction, and thus operate over either of the blades 28 or 29 as may be preferred. The disk 25 with the cutters attached is mounted for rotation upon a stud 31 rising from a bracket 32, the latter being connected to one of the frame members 12. The bracket 32 is also provided with a bearing for a shaft 33 which carries a bevel pinion 34 engaging with a bevel gear 35 connected to or forming a part of the body 25. By this arrangement it will be obvious that the disk 25 is supported for rotation and its rotation accomplished by the corresponding rotation of the shaft 33. The ground wheel 20 is provided with a gear 36, preferably a face gear, and engaging a pinion 37 upon a longitudinal shaft 38, the latter being supported from the lower frame and carrying a bevel gear 40 which in turn engages with a bevel pinion 41 on the shaft 33. By this arrangement it will be obvious that the rotation of the wheel 20 will be communicated to the body 25 through the action of the connecting gearing and shafts.

The short or countershaft 33 is arranged to be reversed in motion when the blades 27 are reversed in position on the body 25, and an improved means for accomplishing this motion is shown, and consists in providing the forward end of the shaft 38 with a relatively long bearing 42 and arranging the pinion 40 to be mounted alternately upon either end of the bearing, the bearing being long enough to permit the pinion 40 to be engaged with the pinion 41 from either side, as illustrated in Fig. 5. The bearing 42 is provided with means such as a keyway 43 to receive a feather, not shown, within the hub of the gear 40, so that while the gear is free to be reversed in position upon the bearing it will partake of the rotary movement of the shaft 38. The free end of the bearing 42 is threaded to receive a binding nut 44, and a sleeve 45 is provided to extend between the washer 46 of the nut 44 and the hub of the gear 40. Thus when the gear 40 is located at one end of the bearing 42 the sleeve 45 will be located between the washer 46 and the gear, and then when the wheel is reversed in position the sleeve will be located between the gear and the stop collar of the shaft 38. By this means the gear will be held firmly in position no matter at which end of the bearing it is located. By this means it will be obvious that the cutters may be arranged to operate over either of the cutting blades 28—29, or changed from a right to a left handed operating device as may be preferred. Thus when one of the blades 28 or 29 becomes dulled the cutter may be quickly reversed and arranged to operate with the sharper blade. By this means the "life" of the machine is materially increased.

The improved device is simple in construction, can be readily applied without material structural changes to various forms of corn harvesters, and will effectually sever the stalks in advance of the binding and shocking mechanism, and, being directly connected to the operating ground wheel, will not require an abnormal amount of power to operate it.

Having thus described the invention, what is claimed as new is:—

1. In an apparatus of the class described, a supporting frame including spaced inner members, means for feeding corn stalks between said inner members, stationary cutting blades carried by said frame and converging rearwardly, a cutter member including a circular body having a plurality of cutting blades with their cutting edges extending tangentially of the periphery of the body and operating beneath said stationary cutting blades, means for reversibly connecting said cutting blades to said body and means for rotating said cutter member in either direction.

2. In an apparatus of the class described, an axle having ground wheels, a supporting frame carried by said axle and including spaced inner members, means for conducting corn stalks between said inner members, a bracket carried by one of said inner members, a circular body mounted for rotation upon said bracket, said body having an annular flange, a plurality of blades reversibly connected to said flange and provided with cutting edges extending tangentially of the periphery of the body, and means for transmitting the motion of said ground wheels to said cutting member.

3. In an apparatus of the class described, an axle having ground wheels, a supporting frame carried by said axle and including spaced inner members, means for conducting corn stalks between said inner members, a bracket carried by one of said inner members, a circular body mounted for rotation upon said bracket, said body having an annular flange, a plurality of blades reversibly connected to said flange and provided with cutting edges extending tangentially of the periphery of the body, means for transmitting the motion of said ground wheels to said cutting member, and means for reversing the motion of said body and its cutters.

4. In an apparatus of the class described, a supporting frame, stationary cutting blades carried by said frame and converging rearwardly, a body mounted for rotation upon said frame, a plurality of cutting blades with their cutting edges extending tangentially of the periphery of the body and operating beneath said stationary cutting blades, means for reversibly connecting said cutting blades to said body, and means for rotating said body in either direction.

In testimony whereof, I affix my signature in presence of two witnesses.

ELIJAH B. ARNOLD. [L. S.]

Witnesses:
    EVA V. MATTESON,
    SAMUEL H. MATTESON.